US012636657B2

(12) United States Patent
Hegde

(10) Patent No.: US 12,636,657 B2
(45) Date of Patent: May 26, 2026

(54) SYSTEM AND A METHOD FOR MICRONIZATION OF SOLID PARTICLES USING VALVULAR CONDUIT

(71) Applicant: Shreepad Hegde, Hyderabad (IN)

(72) Inventor: Shreepad Hegde, Hyderabad (IN)

( * ) Notice: Subject to any disclaimer, the term of this patent is extended or adjusted under 35 U.S.C. 154(b) by 381 days.

(21) Appl. No.: 18/563,137

(22) PCT Filed: Sep. 15, 2021

(86) PCT No.: PCT/IB2021/058403

§ 371 (c)(1),
(2) Date: Nov. 21, 2023

(87) PCT Pub. No.: WO2022/248927

PCT Pub. Date: Dec. 1, 2022

(65) Prior Publication Data

US 2024/0226910 A1 Jul. 11, 2024

(51) Int. Cl.
*B02C 19/06* (2006.01)
*B02C 19/00* (2006.01)
*B02C 23/08* (2006.01)

(52) U.S. Cl.
CPC ............ *B02C 19/06* (2013.01); *B02C 19/005* (2013.01); *B02C 23/08* (2013.01)

(58) Field of Classification Search
CPC ....... B02C 19/005; B02C 19/06; B02C 23/24; B02C 23/30; B01J 2/16; B29B 2017/0428

(Continued)

(56) References Cited

U.S. PATENT DOCUMENTS 275,566 A * 4/1883 Bailey ..................... B02C 19/06 241/39
1,777,205 A * 9/1930 Kutaszewicz ......... B02C 19/005 241/39

(Continued)

FOREIGN PATENT DOCUMENTS

EP 2838661 A1 6/2016

OTHER PUBLICATIONS

International Search Report mailed Dec. 1, 2022 issued in connection with International Application No. PCT/IB2021/058403 (3 pages total).

(Continued)

*Primary Examiner* — Jared O Brown
(74) *Attorney, Agent, or Firm* — Tatonetti IP

(57) ABSTRACT

A system for micronization of solid particles using valvular conduit includes one or more compressed gas lines provided with respective compressed gas inlet, one or more powder feeders, each of which are installed in a respective compressed gas lines. Furthermore, one or more valvular conduit modules are included, each of which are made of a series of valves connected via a common passage, and each valvular conduit module is connected downstream of the respective one or more powder feeders. Further, a cyclonic separator is connected with all the respective compressed gas lines connected with respective outlets of the respective one or more valvular conduit modules, and one or more particle size analysers in combination with one or more directional valves disposed on the compressed gas lines proximal to the outlets of the one or more valvular conduit modules.

10 Claims, 5 Drawing Sheets

(58) Field of Classification Search
USPC ........................................................ 241/5, 39
See application file for complete search history.

(56) References Cited

U.S. PATENT DOCUMENTS

| | | | | | |
|---|---|---|---|---|---|
| 2,552,603 | A * | 5/1951 | Tanner | B02C 19/06 | 241/39 |
| 3,077,308 | A * | 2/1963 | Rozsa | B02C 19/06 | 241/5 |
| 3,559,895 | A * | 2/1971 | Fay | B02C 19/061 | 241/5 |
| 4,538,764 | A * | 9/1985 | Dunbar | B02C 19/065 | 241/39 |
| 4,592,302 | A * | 6/1986 | Motoyama | B01J 2/006 | 241/39 |
| 4,930,707 | A * | 6/1990 | Kashiwagi | B02C 19/066 | 241/5 |
| 5,435,496 | A * | 7/1995 | Kanda | B02C 19/06 | 241/5 |
| 5,765,766 | A * | 6/1998 | Yoshida | B02C 19/066 | 241/39 |
| 8,777,139 | B2 * | 7/2014 | Yagome | B02C 19/066 | 241/40 |
| 2008/0173738 | A1 * | 7/2008 | Montag | B02C 19/005 | 241/5 |
| 2015/0083830 | A1 * | 3/2015 | Leone | B02C 19/06 | 241/34 |

OTHER PUBLICATIONS

Written Opinion mailed Dec. 1, 2022 issued in connection with International Application No. PCT/IB2021/058403 (6 pages total).

* cited by examiner

SYSTEM AND A METHOD FOR MICRONIZATION OF SOLID PARTICLES USING VALVULAR CONDUIT

CROSS-REFERENCES TO RELATED APPLICATIONS

This Non-Provisional Utility application is a US National Stage Application that claims the benefit of and priority to PCT Application Serial No. PCT/IB2021/058403, filed Sep. 15, 2021, entitled "A System and a Method for Micronization of Solid Particles using Valvular Conduit," which claims the benefit of and priority to Indian Patent Application Serial No. 202141023139, filed May 24, 2021, entitled "A System and a Method for Micronization of Solid Particles using Valvular Conduit," the entire contents of both applications of which are hereby incorporated herein by reference.

FIELD OF THE INVENTION

Embodiments of the present invention generally relate to systems and apparatuses for reducing particle size of solid materials, and more particularly to a system and a method for micronization (Grinding) of solid particles using valvular conduit.

BACKGROUND

The micronization is a term used for size reduction of powdery material. The Gas jet mill grinds the powdery material with high speed gas to impact particles into each other and to the surface of the mill. Jet mills can be designed to grind the particles to the required size resulting in a narrow particle size distribution of the resulting product. Particles leaving the mill can be separated from the gas stream by cyclonic separation or any other method and or using filter media of required type and size.

Gas jet mills are generally used to mill the heat sensitive product. Generally heat is generated during grinding process. The gas jet mills are most suitable where the grinding has to be done without elevating product temperature. The compressed gas used in the jet mill takes away the heat as soon as it is generated during grinding.

The existing micronizer has a pancake style circular, shallow, cylindrical chamber. High pressure compressed gas is fed into this chamber through a nozzle. The compressed gas is then split into different streams inside and injected into the inner cylinder in a tangential direction. This creates a strong vertex inside the chamber. The exit nozzle is provided at the centre of the micronizer. The gas entered into the chamber through tangential nozzles leaves the chamber through central nozzle.

Through the another nozzle the powder material to be grinded is fed into the chamber using a venturi suction.

The current micronizer is one pass grinding process. Powder enters into micronizer and leaves through the exit along with compressed gas. If the product is not grinded to the required particle size in the first instance, operator has a limited options. Generally, the pressure is increased so that the particle gets grinded at higher pressure. If the product is still not grinded to the required size, then operator has to manually collect the product at cyclonic separator and manually feed back into micronizer for regrinding. Grinding and regrinding till until required particle size is reached, is a tedious process. The current micronization process is highly energy consuming, dusty and manual.

Due to inherent design drawback, existing design is low in productivity. The system is not flexible for multi-stage grinding. It is not possible to add more grinders inline in series. In the existing design, multistage and modular operation is not possible.

Other option to reduce the particle size is to increase the pressure so that more energy is provided into the system for grinding. However, increasing the pressure leads to so many complications. Firstly, providing higher pressure is always a safety concern, which cannot be neglected at any cost. Then, generating higher pressured compressed gas is highly energy consuming, therefore, not suitable. Also, the transportation of high pressure compressed gas from generator to required area is another major concern of safety as well as expenses. It is already known to a skilled addressee that generating high pressure compressed gas is an expensive process in itself.

To add to the problems of the existing micronizer, it is to be noted that at the end of each pass of grinding, the compressed gas has to be vented out as it is rendered useless. The venting of high pressure compressed gas (through cyclone) is loss of huge energy. In the existing micronizer there is no possibility of reusing the compressed gas for further grinding. Additionally, the existing micronizer is very heavy in construction and it is very difficult to open it for inspection and cleaning.

Hence, there exists a need for a system and a method for micronization of solid particles using valvular conduit and does not suffer from the above mentioned deficiencies. Such system and method should be energy efficient, easy to use, flexible in operation, modular, simple in construction and should be capable of reusing the spent compressed gas for multiple grinding stages.

SUMMARY

The object of the present invention is to provide a system and a method for micronization of solid particles using valvular conduit.

Another object of the invention is to provide energy efficient, easy to use and flexible system and method for micronization.

Yet another object of the invention is to provide a system and method that allows for reusing the compressed gas for multiple grinding passes.

Yet another object of the invention is to utilise valvular conduit modules, comprising of a series of valves, that are simple in construction and easy to maintain.

Yet another object of the invention is to utilise multiple valvular conduit modules together in a series and/or parallel combination to achieve the desired reduction in particle size.

Yet another object of the invention is to automate the whole process of micronization of solid particles till the desired reduction is achieved.

According to a first aspect of the present invention, there is provided a system for micronization of solid particles using valvular conduit. The system comprises one or more compressed gas lines provided with a respective compressed gas inlet; one or more powder feeders, each installed in a respective compressed gas line of the one or more compressed gas lines; one or more valvular conduit modules, each made of a series of valves connected via a common passage, wherein each valvular conduit module is connected downstream of the respective one or more powder feeders on the respective compressed gas line; a cyclonic separator (or any other separating device) connected with all the respective compressed gas lines connected with respective outlets of the respective one or more valvular conduit modules; and one or more particle size analysers in combination with one or more directional valves disposed on the respective compressed gas lines proximal to the outlets of the one or more valvular conduit modules.

Further, the one or more compressed gas inlets are configured to receive compressed gas in the respective compressed gas line. Also, the one or more powder feeders adapted to feed powdery material to be micronized into the compressed gas flowing in the respective compressed gas line, thereby forming a powder-gas stream. Moreover, the one or more valvular conduit modules are adapted to receive the powder-gas stream in a first modular valve of the series of valves, from the respective compressed gas line; and split the powder-gas stream into two streams and facilitate collision of particles of the powdery material in the split streams, in each of the series of modular values, thereby causing a particle size of the powdery material to reduce due to high impact collisions. Furthermore, the one or more particle size analysers are configured to analyse the particle size of the powdery material in the micronized powder-gas stream coming out of the one or more valvular conduit modules. Then, the one or more directional valves are configured to direct the flow of the micronized powder gas stream to the one or more valvular conduit modules for further size reduction when the analysed particle size is larger than a desired size; and direct the flow of the micronized powder gas stream to the cyclonic separator, when the analysed particle size is equal to or less than the particle desired size. In addition, the cyclonic separator is configured to segregate the micronized powdery material from the compressed gas.

In accordance with an embodiment of the present invention, the powdery material is selected may be crystalline or amorphous form pharmaceutical, chemical, fertiliser, cement, minerals and ores, food or from any other Industries.

In accordance with an embodiment of the present invention, each of the series of valves in the one or more valvular conduit modules include a flow diverter in a middle and a round contour at an end of the valve. Also, the flow diverters split the incoming powder-gas stream into two such that one stream goes straight into the common passage and other goes over towards the round contour; and the round contour causes one of the split powder-gas streams to change direction to collide with the split powder gas stream in the common passage before passing to the next valve in the series.

In accordance with an embodiment of the present invention, the one or more valves are arranged in a series to form a valvular conduit module. Series of valves make the valvular conduit module. Valvular conduit module may have single or multiple valve in series, or in parallel to form a valvular conduit module. Each module may have one or more parallel valvular conduit module.

In accordance with an embodiment of the present invention, the one or more valvular conduit modules are arranged in a series and/or parallel arrangement with respect to each other, with the one or more directional valves enabling interconnection of the one or more valvular conduits.

In accordance with an embodiment of the present invention, the system comprises one or more pressure measuring instruments configured to monitor pressure drop across the one or more valvular conduit modules.

In accordance with an embodiment of the present invention, the one or more particle size analysers are selected from, but not limited to, dynamic particle size sensors and filters having predetermined mesh size.

According to a second aspect of the present invention, there is provided a method for micronization of solid particles using valvular conduit. The method comprises receiving compressed gas via one or more compressed gas inlets in respective one or more compressed gas lines; feeding powdery material to be micronized into the compressed gas flowing in the respective compressed gas line, thereby forming a powder gas stream; receiving the powder-gas stream in respective one or more valvular conduit modules made of a series of valves, from the respective compressed gas line; splitting the powder-gas stream into two streams and facilitating collision of particles of the powdery material in the split streams, in each of the series of modular values, thereby causing a particle size of the powdery material to reduce due to high impact collisions; analysing the particle size of the powdery material in the micronized powder-gas stream coming out of the one or more valvular conduit modules; directing a flow of the micronized powder gas stream to the one or more valvular conduit modules for further size reduction when the analysed particle size is larger than a desired size; directing the flow of the micronized powder gas stream to the cyclonic separator, when the analysed particle size is equal to or less than the particle desired size; and segregating the micronized powdery material from the compressed gas.

In accordance with an embodiment of the present invention, the powdery material is selected may be crystalline or amorphous from pharmaceutical, chemical, fertiliser, cement, minerals and ores, food or from any other Industries.

In accordance with an embodiment of the present invention, each of the series of valves in the one or more valvular conduit modules include a flow diverter in a middle and a round contour at an end of the valve. Herein, the flow diverters split the incoming powder-gas stream into two such that one stream goes straight into the common passage and other goes over towards the round contour; and the round contour causes one of the split powder-gas streams to change direction to collide with the split powder gas stream in the common passage before passing to the next valve in the series.

In accordance with an embodiment of the present invention, the one or more valvular conduit modules are arranged in a series and/or parallel arrangement with respect to each other, with one or more directional valves enabling interconnection of the one or more valvular conduit modules.

In accordance with an embodiment of the present invention, the method also comprises a step of monitoring pressure drop across the one or more valvular conduit modules.

BRIEF DESCRIPTION OF THE DRAWINGS

These and other features, aspects, and advantages of the example embodiments will become better understood when the following detailed description is read with reference to the accompanying drawings in which like characters represent like parts throughout the drawings, wherein.

Figure 1:
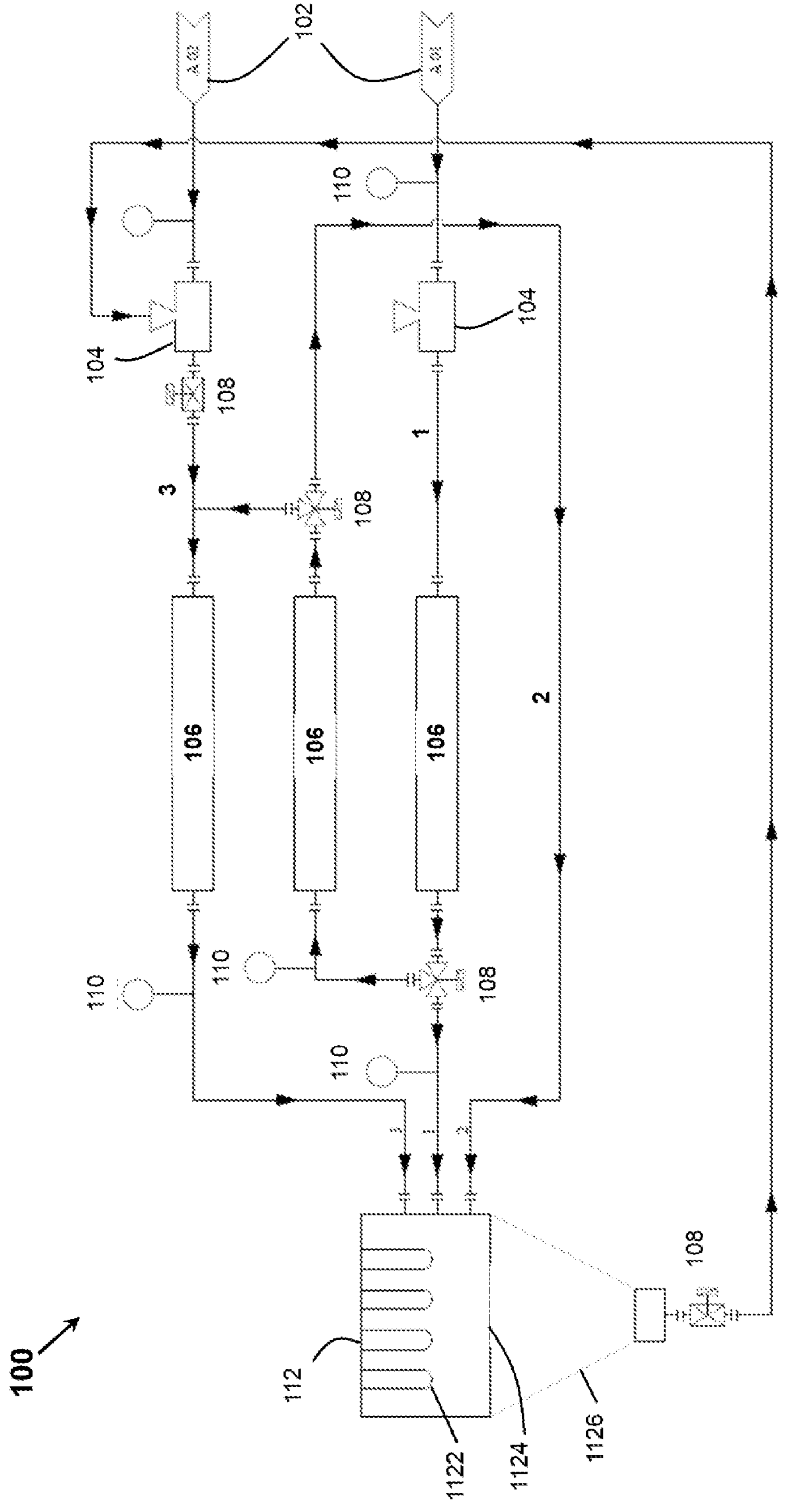
FIG. 1 illustrates a system for micronization of solid particles using valvular conduit, in accordance with an embodiment of the present invention.

Further, skilled artisans will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present invention so as not to obscure the figures with details that will be readily apparent to those of ordinary skill in the art having the benefit of the description herein.

DETAILED DESCRIPTION OF THE DRAWINGS

While the present invention is described herein by way of example using embodiments, those skilled in the art will recognize that the invention is not limited to the embodiments described herein. It should be understood that the description herein is not intended to limit the invention to the particular form disclosed, but on the contrary, the invention is to cover all modification/s, equivalent/s and alternative/s falling within the scope of the present invention. The headings used herein are for organizational purposes only and are not meant to be used to limit the scope of the description or the claim. As used throughout this description, the word "may" be used in a permissive sense (i.e., meaning having the potential to), rather than the mandatory sense (i.e., meaning must).

Further, the words "a" or "an" means "at least one" unless otherwise mentioned. Furthermore, the terminology and phraseology used herein is solely used for descriptive purposes and should not be construed as limiting in scope. Language such as "including", "comprising", "having", "containing", or "involving" and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes. Any discussion of documents, acts, materials, devices, articles and the likes are included in the specification solely for the purpose of providing a context for the present invention. It is not suggested or represented that any or all these matters form part of the prior art base or were common general knowledge in the field relevant to the present invention.

In this disclosure, whenever an element or a group of elements is preceded with the transitional phrase "comprising", it is understood that we also contemplate the same composition, element or group of elements with transitional phrases "consisting of", "consisting", "selected from the group of consisting of", 'including", or "is" preceding the recitation of the composition, element or group of elements and vice versa.

This invention described herein may be embodied in many different forms and should not be construed as limited to the embodiment set forth herein. Rather, the embodiments are provided so that this disclosure will be thorough and complete and will fully convey the scope of the invention to those skilled in the art. In the following description, numeric values and ranges are provided for various aspects of the implementations described. These values and ranges are to be treated as examples only and are not intended to limit the scope of the claims. In addition, a number of materials are identified as suitable for various facets of the implementations. These materials are to be treated as exemplary and are not intended to limit the scope of the invention.

FIG. 1 illustrates a system (100) for micronization of solid particles using valvular conduit, in accordance with an embodiment of the present invention. Herein, the solid particles are envisaged to be of powdery material selected from, but not limited to crystalline or amorphous from pharmaceutical, chemical, fertiliser, cement, minerals and ores, food or from any other Industries. For example, disaccharides powder may include sucrose (table sugar), lactose (milk sugar), Sodium Naproxin, trisodium phosphate etc. In simple terms, the present invention utilises compressed gas, powder feeders (104), valvular conduit modules (106) and a cyclonic separator (112) to micronize or grind the powdery material into much finer powder that can be collected in a suitable container. The system (100) will now be described in detail with reference to FIG. 1.

As shown in FIG. 1, the system (100) comprises one or more compressed gas lines (1) (2) (3) provided with a respective compressed gas inlet (102); one or more powder feeders (104), each installed in the respective compressed gas line; one or more valvular conduit modules (106) connected downstream of the respective one or more powder feeders (104) on the respective compressed gas line; a cyclonic separator (112) connected with the all the respective compressed gas lines (1) (2) (3) connected with respective outlets of the respective one or more valvular conduit modules (106); and one or more particle size analysers in combination with one or more directional valves (108).

As can be seen from FIG. 1, there are three compressed gas lines (1) (2) (3) in the exemplary embodiment of system (100). Herein, the compressed gas line (1) and compressed gas line (3) are independent, i.e., they have their own compressed gas inlet (102) and powder feeder (104). Whereas the compressed gas line (2) is a connecting gas line that has an additional valvular conduit module (106) and offers connection between the compressed gas line (1), compressed gas line (3) and the cyclonic separator (112) if required. Compressed Air, Nitrogen, Argon or any suitable gas may be used as a compressed gas. Herein, the one or more compressed gas lines (1) (2) (3) may have, but not limited to, a tubular cross-section to offer minimum resistance to the compressed gas flowing therein. However, it will be appreciated by a skilled addressee that any other cross may also be used without departing from the scope of the present invention.

Additionally, the compressed gas is supplied to the one or more compressed gas lines (1) (2) (3) through the compressed gas inlets (102) using, but not limited to, one or more compressors, compressed gas reservoirs etc. at a desired pressure. Compressed gas pressure may vary from 0-20 bar or even higher if required. The desired pressure is selected based upon the powdery material to be micronized. Also, one or more closure mechanisms or valves may be provided at the inlet to prevent the leakage or escape of the compressed gas. It will be understood by a skilled addressee that other common components of the system (100) involving compressed gas, such as pressure regulators, pressure gauges, flow meters, temperature gauges, filling pipes etc. may also be used in the present invention without departing from the scope.

Further, the one or more powder feeders (104) are provided in the system (100). Each powder feeder (104) is installed in the respective compressed gas line. The one or more powder feeder (104) may be, but not limited to, a venturi, rotary gas lock type, screw feeders, spiral feeders, gravimetric feeders etc. depending upon the powdery material to be micronized. The system (100) also include one or more electronic semiautomatic or automatic weighing and dispensing means to monitor the amount of powder being fed in each of the one or more compressed gas lines (1) (2) (3) and also schedule a timing of the powder feed.

Figure 2A:
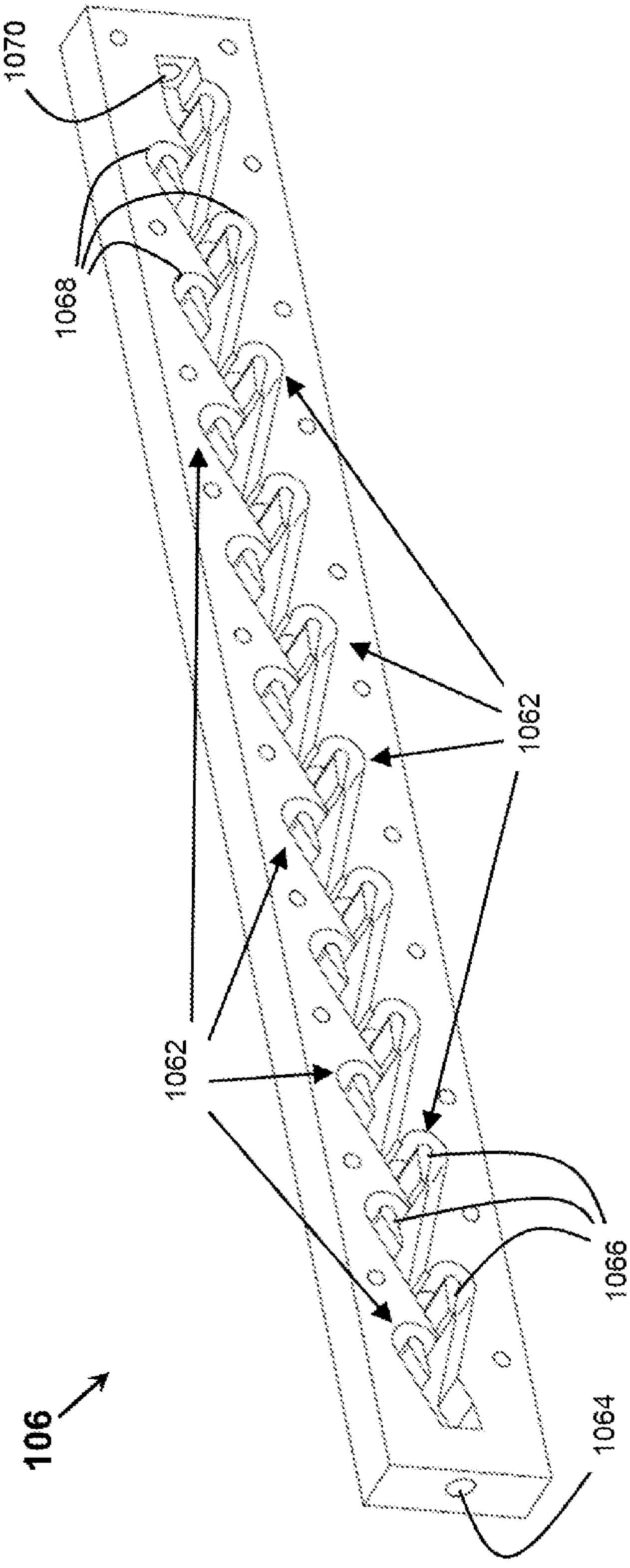
FIG. 2A-2B illustrate the valvular conduit module of the system of FIG. 1, in accordance with an embodiment of the present invention.
Figure 2B:
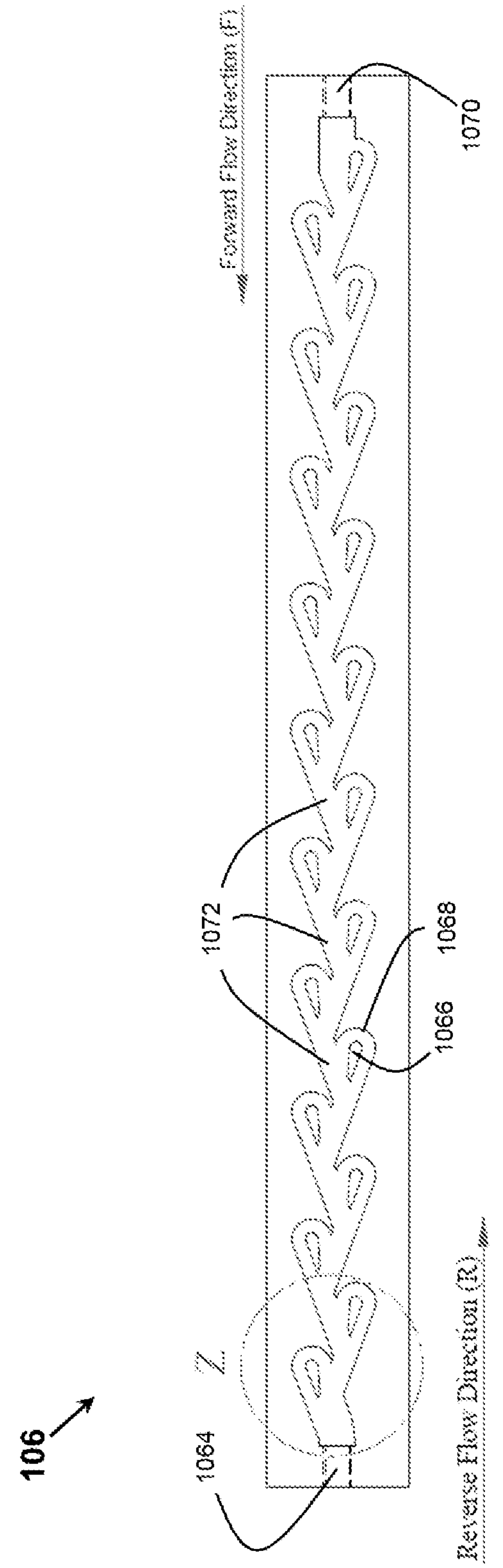

Furthermore, one or more valvular conduit modules (106) are provided in the system (100). Each compressed gas line (1) (2) (3) is envisaged to have a valvular conduit module (106) connected downstream of the respective powder feeder (104). In the exemplary embodiment shown in FIG. 1, it can be seen that there are three valvular conduit modules (106) provided on three compressed gas lines (1) (2) (3). The valvular conduit module (106) has been illustrated in FIGS. 2A-2C, in accordance with an embodiment of the present invention. FIG. 2A shows a perspective view and FIG. 1B shows a front view of the valvular conduit module (106). As shown in FIG. 2A-2B, each valvular conduit module (106) is made of a series of valves (1062) connected via a common passage (1072). There is an inlet (1064) at one end of the valvular conduit module (106) to receive the powder-gas stream for micronization and an outlet (1070) on the opposite end of the valvular conduit module (106) to allow the micronized powder-gas stream to flow out of the valvular conduit module (106).

Herein, each valve has a flow diverter (1066) in a middle and a round contour (1068) at an end of the valve. As can be observed from the FIGS. 2A-2B, one side of each valve (1062) is slightly open which can also be seen as an overlapping portion of the two consecutive valves. This forms the common passage (1072) between adjacent valves (1062) and this common passage (1072) continues from the first valve to the last valve. The valves (1062) can be seen to be arranged in a series, wherein the valves (1062) are alternately disposed above and below an imaginary horizontal central axis. Such a design allows for abrupt changes in the direction of the powder-gas stream flowing therebetween and facilitates the process of micronization of powdery material.

The one or more valvular conduit module (106) may be in shapes of, but not limited to, rectangular or annular or circular or ring or disk like two dimensional or three dimensional. The one shown in the FIG. 2A-2B is in rectangular shape. The same may be fabricated in a tubular design without any problems. In one embodiment, the series of valves (1062) in the valvular conduit module (106) may be provided as modular valves which can be added or subtracted as per the particle size reduction requirements, to increase or decrease a length of the valvular conduit module (106). Also, a geometry and size of each valve in the valvular conduit module (106) may be decided on the basis of the flow requirement. Apart from this, the one or more valvular conduit modules (106) may be arranged in series or parallel arrangement with respect to each other. The series arrangement is preferred when one pass of grinding is not sufficient for desired micronization. In that scenario, the powder-gas stream can be made to flow through multiple valvular conduit modules (106) arranged in the series. In simple terms, the exit particles from one valvular conduit module (106) can be fed into to another valvular conduit module (106) for further reduction of particle size.

While the parallel arrangement is advantageous for single pass process, where the powder-gas streams can be parallelly fed to multiple compressed gas lines (1) (3) and the respective valvular conduit modules (106) to generate more output at the same time and increase the capacity. In some embodiments, both arrangements can be provided in the same system (100), as has been shown in FIG. 1. It can be seen that although a parallel arrangement is visible in the FIG. 1, but, when required, additional compressed gas line (2) and valves (108) have been provided to enable the series arrangement between the valvular conduit module (106) on compressed gas line (1) and the valvular conduit module (106) on compressed gas line (2), as well as between each of the valvular conduit modules (106) on compressed gas lines (1), (2) and (3).

Apart from the that, the system (100) also includes the cyclonic separator (112). The cyclonic separator (112) is connected with the all the respective compressed gas lines (1) (2) (3) connected with respective outlets of the respective one or more valvular conduit modules (106). The cyclonic separator (112) is used for segregation of powdery particle from the compressed gas. The cyclonic separator (112) may be, but not limited to, a cylindrical vessel with tangential entry, a filter (1122) at the top and with a powder collection vessel (1126) in the bottom. Also, a conidur mesh (1124) may be used in the upper side below the filter for improved powder separation efficiency of the cyclonic separator (112).

In accordance with an embodiment of the present invention, an air classifier (not shown) may be provided along with the cyclonic separator (112). The air classifier envisaged to segregate the particles—size wise. Let's say, for example: all particles less than 10 micron will be collected in air classifier and all particles above 10 micron will be passed onto the cyclonic separator (112). The cyclonic separator just collects all the particles whichever comes into it. It does not separate on the basis of particle size, so the air classifier may be deployed to do the same in the system. However, it will be appreciated by a skilled addressee, that the cyclonic separator (112), alone is enough to successfully carry out the purpose of the present invention, and the air classifier is just meant to provide an additional advantage.

Also included in the system (100) are the one or more particle size analysers (not shown) in combination with one or more directional valves (108) disposed on the respective compressed gas lines (1) (2) (3) proximal to the outlets of the one or more valvular conduit modules (106). The one or more directional valves (108) may be selected from, but not limited to, 2-way valves or 3-way valves configured to direct the flow of the powder gas stream coming out of the one or more valvular conduit modules (106). The one or more particle size analysers are selected from, but not limited to, dynamic particle size sensors and filters having predetermined mesh size. The dynamic particle sensors may include, but not limited to, ultrasonic sensors, imaging sensors or the like, connected with an external processor, to dynamically determine the particle size in the powder-gas stream coming out of each of the one or more valvular conduit modules (106). Moreover, one or more pressure measuring instruments (110) may also be disposed in the system (100), configured to monitor pressure drop across the one or more valvular conduit modules (106).

Figure 2C:
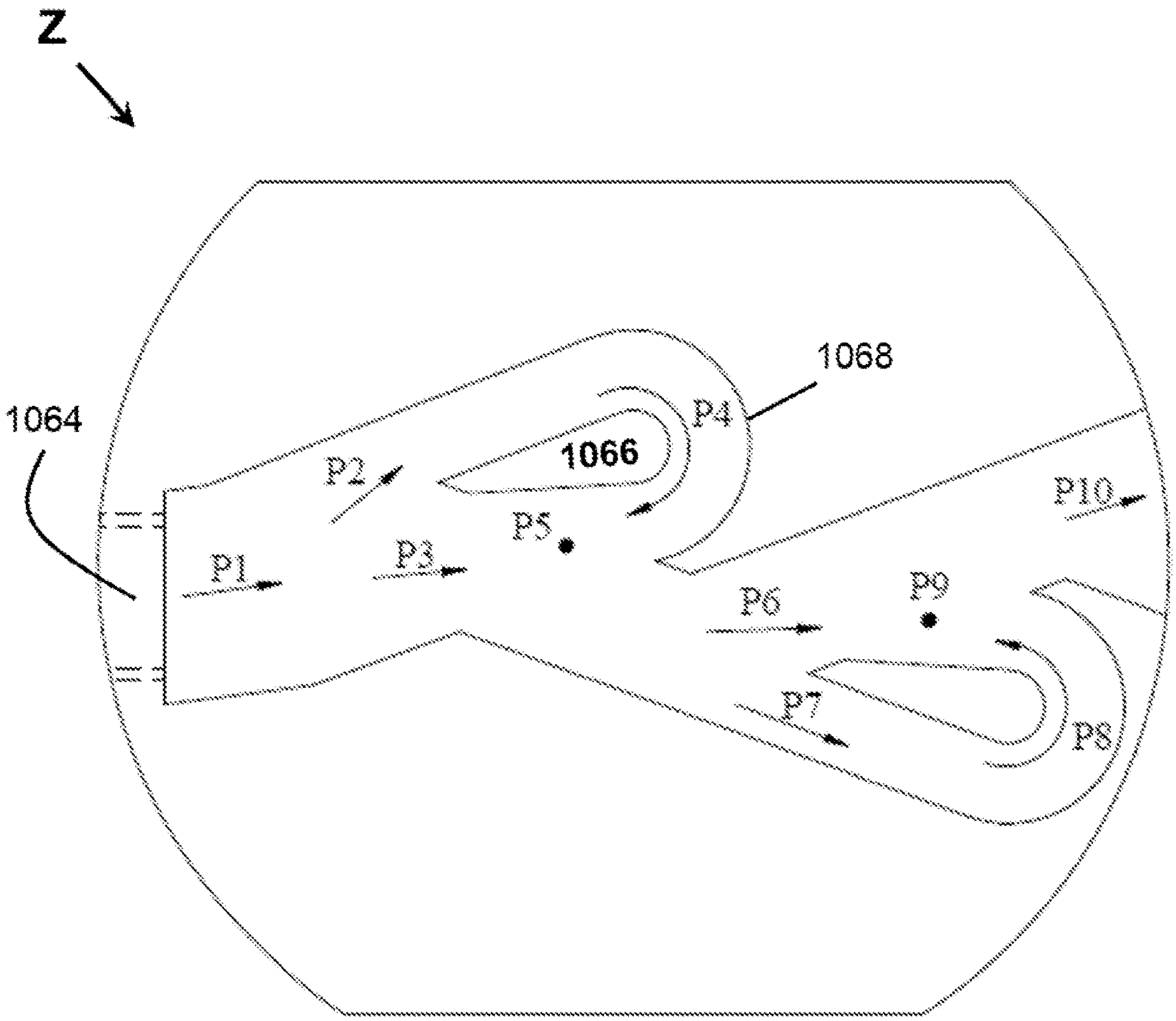
FIG. 2C illustrates a detailed view of a series of valves of the valvular conduit module of FIG. 2A-2B, in accordance with an embodiment of the present invention.
Figure 3:
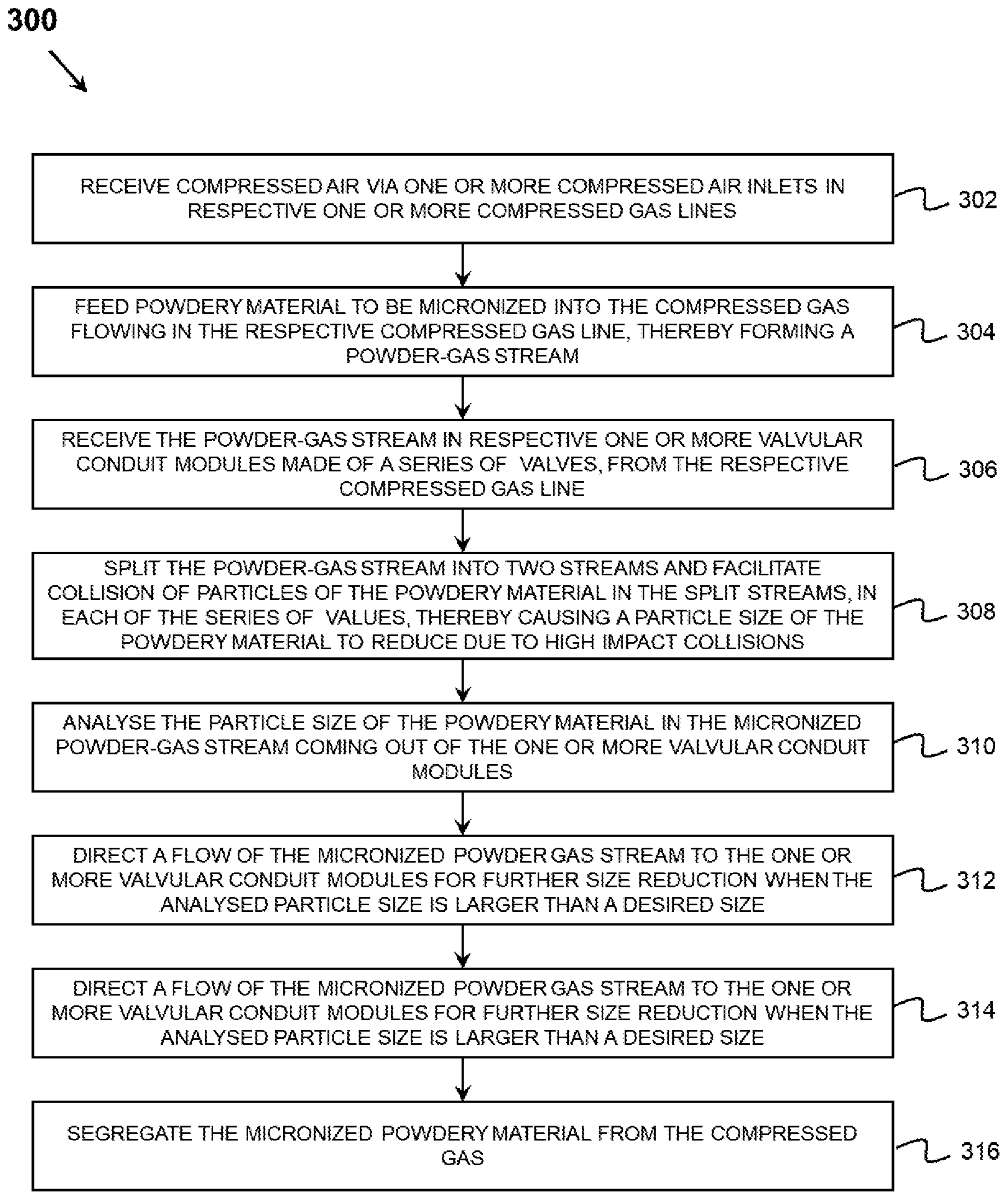
FIG. 3 illustrates a method for micronization of solid particles using valvular conduit module, in accordance with an embodiment of the present invention.

The present invention operates in the following manner:

FIG. 3 illustrates a method (300) for micronization of solid particles using valvular conduit module (106), in accordance with an embodiment of the present invention. The method (300) of operation will be understood better with reference to the FIG. 1 and FIGS. 2B-2C. The method (300) begins at step 302, receiving compressed gas via one or more gas compressed gas inlets (102) in respective one or more compressed gas lines (1) (2) (3). The same has been shown in FIG. 1 with the help of arrows to denote the direction of flow. Compressed gas with variable pressure and flow adjustment may be provided. At step 304, the powdery material to be micronized is fed into the compressed gas flowing in the respective compressed gas lines (1) (2) (3). Herein, the powdery material is charged into the high pressure compressed gas using the respective one or more powder feeders (104) installed on the respective cone or more compressed gas lines (1) (2) (3). This results into a formation of a powder gas stream in the respective compressed gas lines (1) (2) (3). After that, at step 306, the powder-gas stream is received in the respective one or more valvular conduit modules (106) connected with the respective one or more compressed gas lines (1) (2) (3) from the inlet. As already explained, each of the one or more valvular conduit module (106) is made up of a series of valves (1062), so the powder-gas stream enters through the inlet (1064) into the first valve. After that at step 308 involves splitting the powder-gas stream into two streams and facilitating collision of particles of the powdery material in the split streams, in each of the series of modular values.

To understand the process of grinding in the valvular conduit module (106) clearly, firstly, the importance of direction as well as principle of working needs to be understood. It will be observed by a skilled addressee that the powder-gas stream travelling through the valvular conduit modules (106) in forward direction (as shown in FIG. 2B) faces lesser obstruction and pass easily without appreciable pressure reduction. In that case, the particle size reduction is minimum, as there is hardly any collision. It simply passes on to the other end of the module without any noticeable grinding. So, the direction plays an important role here.

However, when the powder-gas stream is fed into the respective valvular conduit module (106) in a reverse direction (as shown in FIG. 2B) under high velocity and pressure, it goes through several abrupt changes in the flow direction, at least twice in each valve. Since the powder particles will have higher mass than the gas, it is difficult for powdery material to change the direction. Also, the different sized particles move at different velocity. Due to difference in the velocity between different particles, they collide against each other. The powdery particles tend to move in straight line till they colloid with another particle or the surface of the valvular conduit module (106). This creates high impact collisions among the powder particles and also with the surface of the valvular conduit module (106). These high impact collisions grind or breakdown the powdery material into finer particles. Therefore, the reverse direction is preferred for better efficiency of particle size reduction.

Now, the same has been applied in the present invention, and can be understood more clearly with reference to FIGS. 2B and 2C. As shown in FIG. 2C, the powder-gas stream PI enters the valvular conduit module (106) through inlet in a reverse direction (R). Then, the powder-gas stream PI strikes the flow diverter and gets split into stream P2 and stream P3 (goes straight into the common passage). Stream P2 goes forward to the round contour and takes change of direction through the round/circular contour to become stream P4. The stream P4 comes back in reverse direction with Stream P3, at P5 (denotes position). Now, the powder gas streams P3 and P4 moving in opposite direction, collide at position P5. This also results in collision of powder particles in the powder-gas stream at a high velocity and pressure.

Due to this high impact collision, the powder particles break into finer particles, thereby reducing the particle size of the powdery material after each collision. After that, the resultant stream is P6 that passes onto next valve of the valvular conduit module (106). The same stream splitting and high impact collision lead to further reduction in particle size of the powdery material, in each valve of the series of valves (1062). So, by the time the powder-gas stream reached the end of the respective valvular conduit module (106), the particle size of the powdery material is significantly reduced within the resultant powder-gas stream, which is referred hereinafter as the "micronized powder-gas stream'.

In accordance with an embodiment of the present invention, the one or more valvular conduit modules (106) can be provided with heat sink arrangement for removing the heat generated during high impact collision. Cold water or cold air may be circulated in the heat sink to take away the heat quickly. Also, the heat released during high impact collision is taken away by the compressed gas, keeping the powder temperature low. It will be understood by a person skilled in the art that the particle size can be controlled using pressure, number of valves (1062) in the valvular conduit module (106) and number of valvular conduit modules (106) in the system Then, continuing from the method (300) of FIG. 3, at step 310, the micronized streams coming out of each of the one or more valvular conduit module (106) are analysed for particle size of the powdery material present therein using the particle size analyser. Herein, the one or more particle size analysers are selected from, but not limited to, dynamic particle size sensors and filters having predetermined mesh size. For example: The dynamic particle sensors may include, but not limited to, ultrasonic sensors, imaging sensors or the like, connected with an external processor, to dynamically determine the particle size in the powder-gas stream coming out of each of the one or more valvular conduit modules (106). So, a predetermined desired particle size after micronization may be prestored in the external processor. OR the filter with predetermined mesh size may be installed downstream of the outlets of the one or more valvular conduit modules (106), to only the predetermined desired particle size after micronization to pass through.

After that, at step 312, the one or more directional valves (108) installed in combination with the particle size analyzer are configured to direct the flow of the micronized powder gas stream to the one or more valvular conduit modules (106) for further size reduction, in case the analysed particle size is larger than a desired size. Further, at step 314, the flow of the micronized powder gas stream is directed to the cyclonic separator (112), in case the analysed particle size is equal to or less than the particle desired size.

This can be achieved in multiple ways such as automatic, semiautomatic and manual. For example, the two-way or three valves may be installed in combination with the particle size sensors, to automatically direct the direct the flow towards the other valvular conduit modules (106) or towards the cyclonic separator (112), depending upon the analyzed size. However, in case of filters, both can be achieved simultaneously. For example, the micronized powder-gas stream that is able to pass through the filter is automatically directed to the cyclonic separator (112), while the powdery material (with size greater than the requirements) collected on the filter is directed to the other valvular conduit modules (106) for further micronization.

Alternately, this processed can be performed in a semi-automatic manner, that requires one time manual calibration. For example: an operator can perform the grinding operation for a powdery material using the valvular conduit module (106) and can take down the measurement readings to know, how much particle size reduction is achieved in a single pass for a particular powdery material of a particular input size. After that, the number of valvular conduit modules (106) and series/parallel arrangement may be decided depending on the measured value and desired output requirements. So, after the above setup, the whole process is performed automatically without any human intervention or requirement of any dynamic particle size sensors.

In accordance with an embodiment of the present invention, the one or more pressure measuring instruments (110) may also be disposed in the system (100), configured to monitor pressure drop across the one or more valvular conduit modules (106). This monitoring helps to maintain the efficient working of system (100) and method (300) as the pressure of the compressed gas play an important role in the grinding process in the one or more valvular conduit modules (106).

After that, the cyclonic separator (112) is configured to receive the micronized powder-gas streams from all the respective compressed gas lines (1) (2) (3) connected with respective outlets of the respective one or more valvular conduit modules (106). Next, at step 316, the cyclonic separator (112) is configured to segregate the micronized powdery material from the compressed gas, which get collected in the powder collection vessel at the bottom. The conduit mesh may be used in the upper side of the cyclonic separator (112) below the filter, for improving the powder collection efficiency of the cyclonic separator (112).

It will be appreciated by a skilled addressee, that in the present specification, using the exemplary system (100) has been shown to involve multiple compressed gas line and multiple valvular conduit modules (106), to show the potential, capability and the scope of the invention, along with how the same system (100) can be used to handle different output/capacity requirements. However, it will be understood by a skilled addressee that the present invention is perfect capable of working with a single compressed gas line, powder feeder (104), single valvular conduit module (106) and the cyclonic separator (112), without departing from the scope of the present invention and the appended claims. The terminology “one or more” before the components of the system (100), has been specifically used to cover both the above scenarios which work on the same inventive concept.

Working Example

The trials of the present invention have already been taken with different powdery products such as, but not limited to, Naproxen Sodium, Trisodium Phosphate and Lactose independently. The results are very encouraging. Initial particle size of the input material observed were 100-150 micro meters (micron). The output particle size after micronization, are observed to be, 2-10 micron. This amounts to 50-75 times reduction of particle size. These particle size reduction is achieved in single pass of length 500-1000 mm length of valvular conduit module. When multiple pass trial was taken, the particle size reduction was further achieved up to 100 nano meters. This amounts to 100 times reduction further. The trial was conducted at 3-10 bar input pressure. Better result are achievable with more trials and optimisation. Further, reduction in the pressure requirement (power consumption) is being aimed, with more data on trial and optimisation. Trial result may vary depending on the powder product physical and chemical properties, input pressure, valvular conduit module geometry and number of valvular conduit module. However, achieving such results using above system and method is unprecedented and completely unknown in the prior art.

The present invention offers a number of advantages. Firstly, it provides a cost effective solution to the problems of prior art. The amount of micronization and size reduction achieved suing the above method and system is unprecedented. Additionally, the valvular conduit module have never been configured in a system for grinding/micronization. Also, in order to fulfil the requirements, the valvular conduit modules may be installed in parallel to increase quantity of the powder to be grinded, while they may be installed in series if further size reduction is desired. This has another advantage that the installation of valvular conduit modules in series re-uses the pressure of incoming compressed gas for further grinding, which was earlier not possible (as explained in the background section). The series installation of valvular conduit modules results in energy conservation and uses the spent energy of previous valvular conduit module. Effective utilisation of spent energy will result in saving in ultimate the energy consumption per unit of particle size reduction. Hence overall energy consumption per unit of powder grinding is reduced, which ultimately translates to reduced cost. Therefore, the present invention has economic significance apart from the technical advancement.

Various modifications to these embodiments are apparent to those skilled in the art from the description and the accompanying drawings. The principles associated with the various embodiments described herein may be applied to other embodiments. Therefore, the description is not intended to be limited to the embodiments shown along with the accompanying drawings but is to be providing the broadest scope, consistent with the principles and the novel and inventive features disclosed or suggested herein. Accordingly, the invention is anticipated to hold on to all other such alternatives, modifications, and variations that fall within the scope of the present invention and the appended claims.

I claim:

1. A system for micronization of solid particles, the system comprising:

one or more compressed gas lines provided with a respective compressed gas inlet;

one or more powder feeders, each installed in a respective compressed gas line of the one or more compressed gas lines;

one or more valvular conduit modules, each made of a series of valves connected via a same passage, wherein each valvular conduit module is connected downstream of the respective one or more powder feeders on the respective compressed gas line;

a cyclonic separator connected with all the respective compressed gas lines connected with respective outlets of the respective one or more valvular conduit modules and one or more particle size analysers in combination with one or more directional valves disposed on the respective compressed gas lines adjacent to the outlets of the one or more valvular conduit modules wherein the one or more compressed gas inlets are configured to receive compressed gas in the respective compressed gas line;

wherein the one or more powder feeders are adapted to feed powdery material to be micronized into the compressed gas flowing in the respective compressed gas line, thereby forming a powder-gas stream;

wherein the one or more valvular conduit modules are adapted to:

receive the powder-gas stream in a first modular valve of the series of valves, from the respective compressed gas line;

split the powder-gas stream into two streams and facilitate collision of particles of the powdery material in the two streams, in each valve of the series of valves, thereby causing a particle size of the particles of the powdery material to reduce due to impact collisions;

wherein the one or more particle size analysers are configured to analyse the particle size of the particles of the powdery material in a micronized powder-gas stream coming out of the one or more valvular conduit modules;

wherein the one or more directional valves are configured to:

direct a flow of the micronized powder-gas stream to the one or more valvular conduit modules for further size reduction when an analysed particle size is larger than a desired size;

direct the flow of the micronized powder-gas stream to the cyclonic separator when the analysed particle size is equal to or less than the desired size;

wherein the cyclonic separator is configured to segregate micronized powdery material from the micronized powder-gas stream.

2. The system as claimed in claim 1, wherein the powdery material is selected from crystalline or amorphous from pharmaceuticals, chemicals, fertilisers, cements, minerals, ores, and foods;

wherein each valve of the series of valves in the one or more valvular conduit modules include a flow diverter in a middle and a round contour at an end of the valve;

wherein each flow diverter splits the powder-gas stream into the two streams such that one of the two streams goes straight into the same passage and the other of the two streams is directed towards the round contour; and wherein the round contour causes the other of the two streams to change direction to collide with the the one of the two gas streams in the same passage before passing to a next valve in the series of valves.

3. The system as claimed in claim 1, wherein the one or more valvular conduit modules are arranged in a series and/or parallel arrangement with respect to each other, with the one or more directional valves enabling interconnection of the one or more valvular conduit modules.

4. The system as claimed in claim 1, comprising one or more pressure and/or flow measuring instruments configured to monitor pressure drop/flow across the one or more valvular conduit modules.

5. The system as claimed in claim 1, wherein the one or more particle size analysers are selected from dynamic particle size sensors and filters having predetermined mesh size.

6. A method for micronization of solid particles, the method comprising:

receiving compressed gas via one or more compressed gas inlets in respective one or more compressed gas lines;

feeding powdery material to be micronized into compressed gas flowing in the respective compressed gas line, thereby forming a powder-gas stream;

receiving the powder-gas stream in respective one or more valvular conduit modules made of a series of valves, from the respective compressed gas line;

splitting the powder-gas stream into two streams and facilitating collision of particles of the powdery material in the two streams, in each valve of the series of valves, thereby causing a particle size of the powdery material to reduce due to impact collisions;

analysing the particle size of the particles of the powdery material in a micronized powder-gas stream coming out of the one or more valvular conduit modules;

directing a flow of the micronized powder-gas stream to the one or more valvular conduit modules for further size reduction when an analysed particle size is larger than a desired size;

directing the flow of the micronized powder-gas stream to a cyclonic separator when the analysed particle size is equal to or less than the desired size; and segregating micronized powdery material from the micronized powder-gas stream.

7. The method as claimed in claim 6, wherein the powdery material is selected from crystalline or amorphous from pharmaceuticals, chemicals, fertilisers, cements, minerals, ores, and foods etc.

8. The method as claimed in claim 6, wherein each valve of the series of valves in the one or more valvular conduit modules includes a flow diverter in a middle and a round contour at an end of each valve;

wherein each flow diverter splits the powder-gas stream into the two streams such that one of the two streams goes straight into the same passage and the other of the two streams is directed towards the round contour; and wherein the round contour causes the other of the two streams to change direction to collide with the the one of the two gas streams in the same passage before passing to a next valve in the series of valves.

9. The method as claimed in claim 6, wherein the one or more valvular conduit modules are arranged in a series and/or parallel arrangement with respect to each other, with one or more directional valves enabling interconnection of the one or more valvular conduit modules.

10. The method as claimed in claim 6, comprising a step of monitoring pressure drop and flow parameters across the one or more valvular conduit modules.

* * * * *